United States Patent [19]

Uyehara et al.

[11] Patent Number: 4,588,309

[45] Date of Patent: May 13, 1986

[54] RESILIENT BEARING SEAL WITH ABILITY TO COMPENSATE FOR WEAR AND COMPRESSION SET

[75] Inventors: Hajime Uyehara, Westminister; Rao R. Nimmagadda, Fountain Valley, both of Calif.

[73] Assignee: Smith International, Inc., Newport Beach, Calif.

[21] Appl. No.: 505,578

[22] Filed: Jun. 20, 1983

[51] Int. Cl.[4] .............................................. E21B 10/08
[52] U.S. Cl. ...................... 384/94; 175/227; 277/92; 277/177
[58] Field of Search ............... 277/177, 72 F, DIG. 6, 277/915, 92; 384/94; 175/227, 228

[56] References Cited

U.S. PATENT DOCUMENTS

| | | | |
|---|---|---|---|
| 2,849,070 | 8/1958 | Maly | 277/9.5 |
| 4,429,854 | 2/1984 | Kar | 384/94 |
| 4,466,622 | 8/1984 | Deane | 384/94 |
| 4,516,640 | 5/1985 | Karlsson | 175/227 |
| 4,516,641 | 5/1985 | Burr | 175/228 |
| 4,552,233 | 11/1985 | Klima | 384/94 |

*Primary Examiner*—Robert I. Smith
*Attorney, Agent, or Firm*—Gabor L. Szekeres

[57] ABSTRACT

A seal assembly particularly adapted for sealing rock bit bearings is disclosed. The seal comprises an O-ring made of a resilient material which swells substantially when effectively exposed to a lubricant used for lubricating the bearing. The O-ring seal is mounted into the rock bit in a relatively low state of compression or squeeze between the surfaces to be sealed. During operation of the bit, the O-ring seal swells due to exposure to the lubricant, and consequently compression or squeeze of the seal increases substantially. The novel seal assembly compensates for undesirable compression set and wear of the O-ring.

6 Claims, 7 Drawing Figures

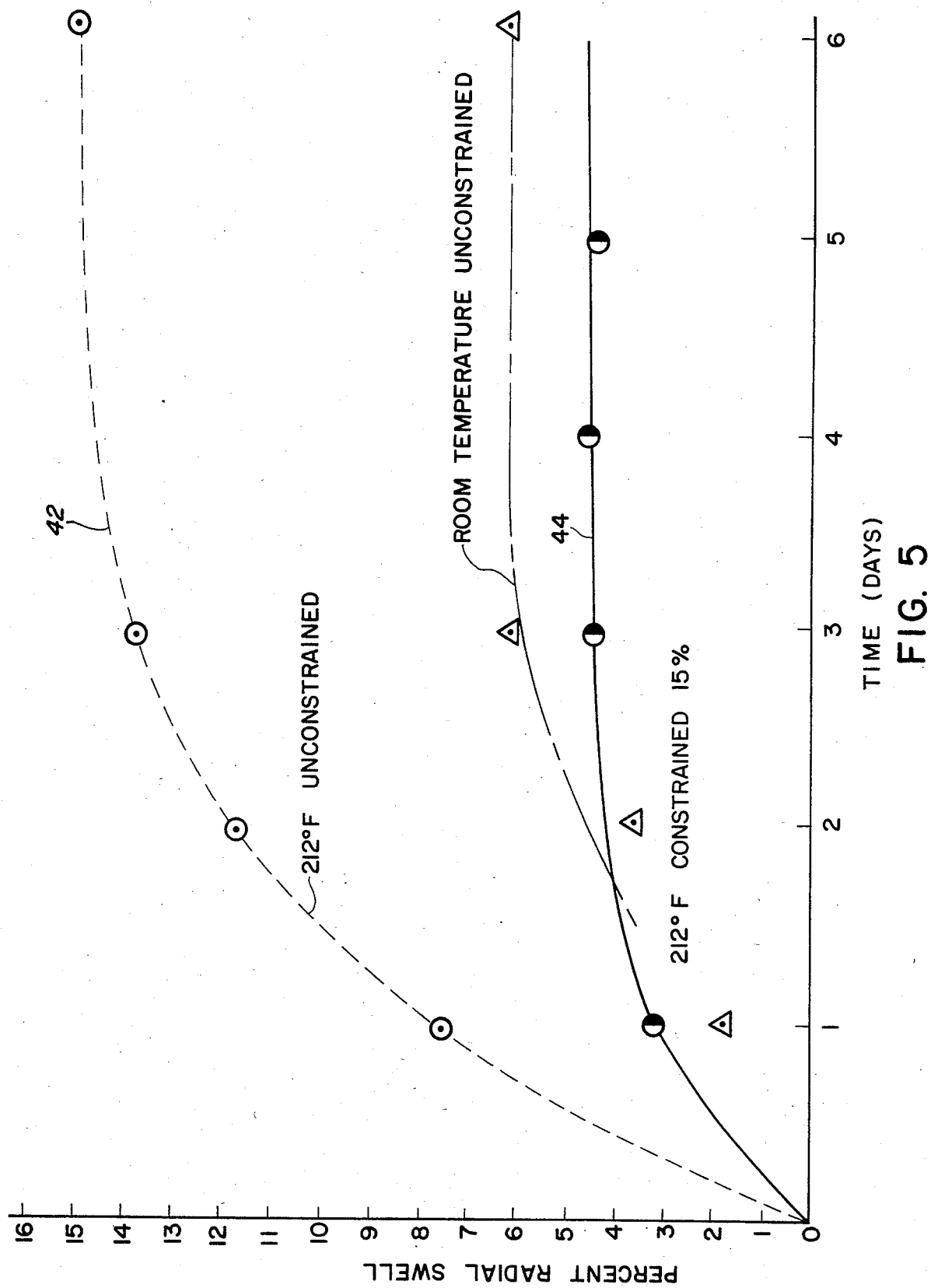

RESILIENT BEARING SEAL WITH ABILITY TO COMPENSATE FOR WEAR AND COMPRESSION SET

BACKGROUND OF THE INVENTION

1. Field of the Invention

The present invention is directed to an improved resilient seal used for isolating lubricated machine parts such as bearings, from the external environment. More particularly, the present invention is directed to an improved O-ring type seal for lubricated bearings of rock bits used for subterranean drilling.

2. Brief Description of the Prior Art

Seals for confining lubricants in machine parts, and particularly O-ring type resilient seals, are old and well known in the art.

As is known, rock bits employed for subterranean drilling when prospecting for oil, gas or minerals, are exposed to a very harsh environment, the present very difficult sealing problems. More specifically, the temperature of the subterranean formation where the rock bit is used, may reach or exceed 280 to 400 degrees F., and the ambient pressure may typically reach several thousand PSI. Moreover, the rock bit is surrounded by drilling mud which is continuously circulated from the surface. One of the functions of the drilling mud is to remove cuttings generated by the rock bit. The drilling mud, and often the subterranean formation itself, have highly corrosive chemical properties and contain highly abrasive particles.

Rock bits designed to operate under the above-mentioned conditions are described, e.g. in U.S. Pat. Nos. 4,358,384 and 4,372,624. Briefly, these and like rock bits wherein the improved seal of the present invention may be most advantageously employed, have a plurality (typicaly three) hollow cutter cones rotatably mounted on journals integral with the drill body. The drill body is rotated about its longitudinal axis either by a rotating drill string driven from the surface, or by a downhole drilling motor.

Each cutter cone has a plurality of cutting teeth. As the teeth of the cutter cones engage the subterranean formation and as the journals are rotated about the longitudinal axis of the drill body, each cutter cone rotates on a bearing relative to its respective journal. The bearing, typically a journal bearing, is lubricated by an internal supply of a suitable lubricant.

Subterranean drilling is very costly. Even the maintenance of a drilling rig and crew at the drilling site is very costly although actual drilling may not occur. Therefore, the procedure required for replacing at great well depth a defective rock bit with a functioning bit, and the accompanying interruption in drilling are also very expensive. For these reasons the useful downhole or service life of rock bits is of great importance to the drilling industry.

Whereas the service life of a rock bit depends on the integrity and proper functioning of many components of the bit, experience has shown that journal bearings of the bits fail rapidly after drilling mud or other extraneous material gains entry into the bearing.

In order to prevent ingress of drilling mud and other extraneous material to the bearings, and also to prevent loss of the lubricating grease into the environment, the prior art has utilized O-ring seals placed between the journal and its rotating cutter cone. However, it was discovered relatively early in the prior art that ordinary O-ring seals capable of providing adequate sealing in less exacting applications are inadequate in rock bits. For this reason, for specific "downhole", rock bit applications, the prior art has provided certain refinements and improvements over the basic O-ring technology.

One such improvement is disclosed in U.S. Pat. No. 3,397,928. In accordance with this disclosure, a resilient O-ring seal is mounted into an annular channel or groove formed between the journal shaft of the rock bit and the hollow cutter cone, in such a manner that, at the time of assembly, the O-ring is compressed or squeezed at least ten percent relative to its original thickness. Compression or squeeze of the O-ring improves its ability to perform under the adverse conditions of subterranean drilling. The O-ring described in the 3,397,928 patent is typically made of butadiene acrylonitrile (Buna N) rubber. In fact, this rubber material is commonly used in O-rings and like seals and packings, where the O-ring seal or packing is exposed to hydrocarbon liquids or hydrocarbon based lubricants.

U.S. Pat. No. 4,372,624 assigned to the same assignee as the present application describes a seal for a rock bit wherein an O-ring is placed into an annular chamber formed between the journal shaft and the hollow cutter cone of the rock bit. The chamber has at least one, preferably two substantially V shaped walls into which the O-ring is progressively pressed whenever fluid pressure on one side of the O-ring significantly exceeds pressure on the other side of the O-ring.

Another improvement over conventional O-ring seals specifically adpated for "downhole", rock bit applications, is described in the application, of William J. Neilson for U.S. Patent, Ser. No. 378,454, filed on May 14, 1982. The Neilson application is assigned to the same assignee as the present application. In accordance wth the teachings of the Neilson application, an annular chamber or seal gland of a rock bit bearing journal and cutter cone assembly has curved walls configured in such a manner that pressure differentials acting on the two sides of an O-ring placed into the chamber, force the O-ring to move parallel with the sealing direction into progressively greater contact with the curved walls of the seal gland.

In other words, in accordance with the Nielson application and also with U.S. Pat. No. 4,372,624 compression or squeeze of the O-ring is temporarily increased and better sealing capability is achieved whenever a relatively large pressure differential acts on the O-ring. As is known, excessive pressure differential normally presents a greater likelihood that fluid or materials may leak through the seal in either direction.

Although the above summarized O-ring seal assemblies provide acceptable sealing capabilities for downhole operation of rock bits, rock bit failures due to failed bearing seals are still common in the industry.

A principal disadvantage of prior art O-ring seals, and particulary of the prior art O-ring seal assemblies used for sealing rock bit bearings, is that the seals do not generally compensate for wear and compression set, or both which occur during use. Furthermore, highly compressed or squeezed seals of the prior art often undergo permanent deformation or "compression set" even before actual use, so that a good portion of the resiliency and "squeeze reserve" of the seal is lost.

In this regard it is noted that in the oil drilling industry approximately 120 hours of uninterrupted service life of a rock bit is considered reasonably good. Thus, the O-ring seals are ideally expected to perform without failure for approximately 120 hours, and preferably longer. The seals, however, undergo significant wear between the bearing journal and the rotating cutter cone, and seal failures in less than 120 hours of rock bit operation are still fairly common in the prior art. The industry is, therefore still striving to improve the wear resistance and hence the useful service life of rock bit seals. The present invention is directed to such an improvement.

SUMMARY OF INVENTION

It is an object of the present invention to provide a seal which swells and is increasingly compressed or "squeezed" as the seal is exposed to a lubricant used for lubricating the machinery where the seal is used.

It is another object of the present invention to provide an O-ring type seal adapted for functioning between a stationary and rotating surface, which seal compensates for progressive wear or compression set, or both, by swelling of the O-ring due to exposure to a lubricant.

It is still another object of the present invention to provide an effective O-ring type seal assembly for journal bearings of rock bits.

It is yet another object of the present invention to provide an effective O-ring type seal assembly for rock bits and other machinery, wherein the seal assembly substantially compensates for compression set and attains a maximum squeeze between the sealed surfaces only after effective exposure to a lubricant used in the rock bit.

These and other objects and advantages are attained by a seal assembly wherein a resilient seal is disposed between two hard surfaces to be sealed. The surfaces comprise part of a machinery such as the journal shaft and hollow cutter cone of a rock bit. The resilient seal is made of a material which swells substantially when effectively exposed to a lubricant used for lubricating the machinery. In rock bit applications, the material of the resilient seal swells substantially when exposed to the lubricating grease used for lubricating the journal bearing.

The seal is mounted in such a manner that during operation of the machinery, the seal is continuously exposed to the lubricant. In rock bits, the seal is located in a peripheral channel between the journal shaft and the hollow cutter cone, and the channel is in fluid communication with an internal supply of lubricating grease which otherwise lubricates the journal bearing.

As the resilient seal swells due to exposure to the lubricant, compression or squeeze of the resilient seal increases between the two hard surfaces. When equilibrium or a quasi equilibrium between the resilient seal and the lubricant is substantially approached or reached, the seal is squeezed at least one percent more between the two hard surfaces than in its initial stage of assembly. The increased "squeeze" of the seal causes a corresponding increase in contact pressure exerted by the resilient seal on the hard surfaces.

The features of the present invention can be best understood, together with further objects and advantages, by reference to the following description, taken in connection with the accompanying drawings wherein like numerals indicate like parts.

BRIEF DESCRIPTION OF THE DRAWINGS

FIG. 5 is a graph showing the swelling of EPDM rubber O-rings as a function of time due to exposure to hydrocarbon based lubricating grease;

DESCRIPTION OF THE PREFERRED EMBODIMENTS

The following specification taken in conjunction with the drawings sets forth the preferred embodiment of the present invention. The embodiments of the invention disclosed herein are the best modes contemplated by the inventors for carrying out their invention in a commercial environment, although it should be understood that various modifications can be accomplished within the parameters of the present invention.

Figure 1:
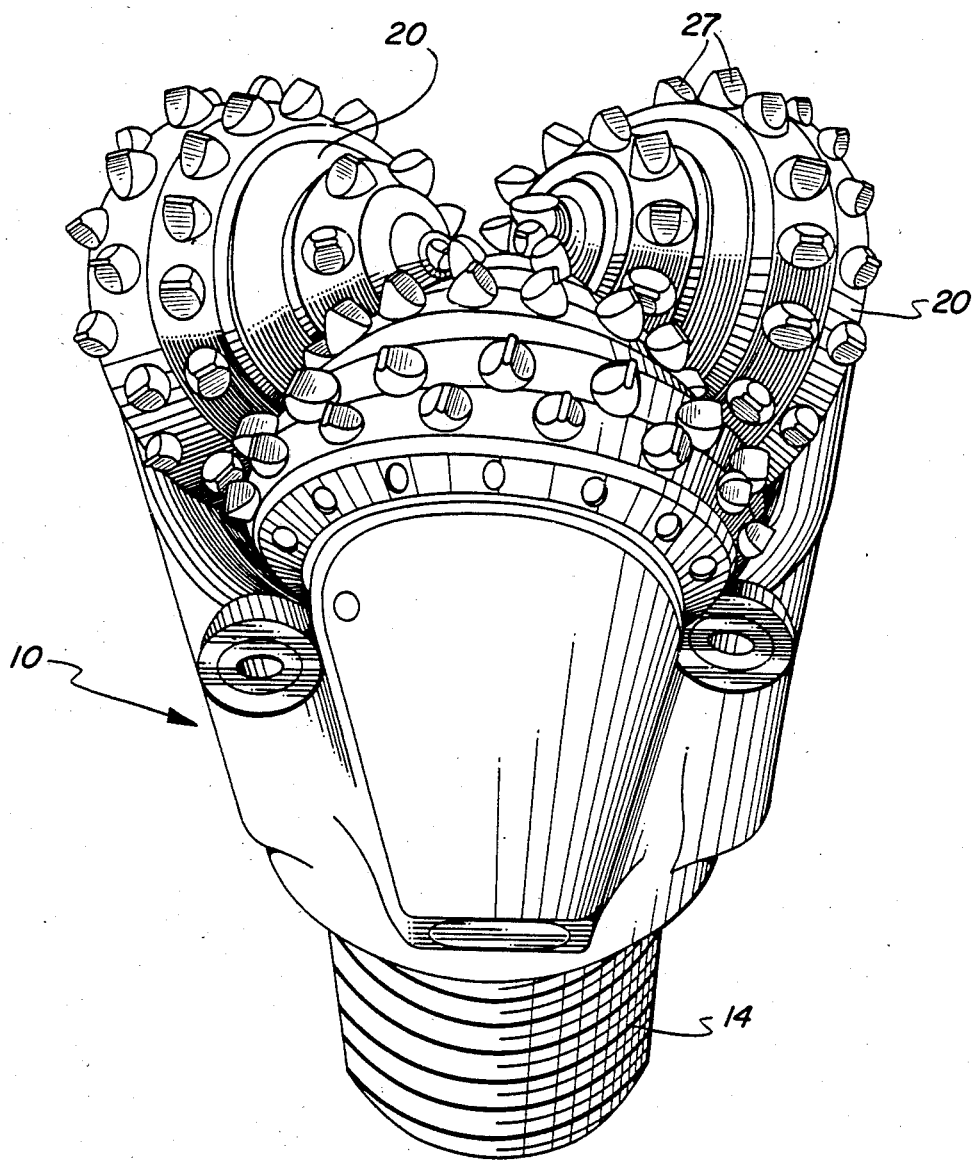
FIG. 1 is a perspective view of a rock bit wherein the seal assembly of the present invention is advantageously used.
Figure 2:
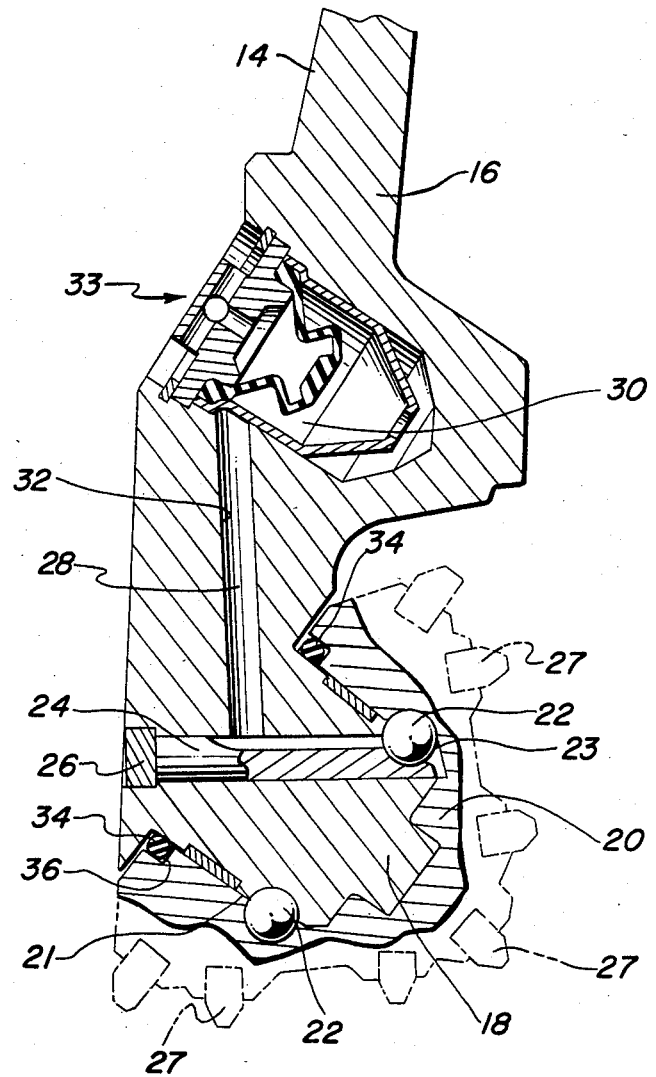
FIG. 2 is a generally longitudinal partial cross-sectional view showing one leg of the rock bit, a hollow cutter cone mounted on the leg on a bearing, and the seal of the present invention mounted to protect the bearing from extraneous material.

Referring now to FIGS. 1 and 2 of the appended drawings, a rock bit 10 is shown in which the seal of the present invention is advantageously used. The rock bit 10 is described here only to the extent deemed necessary to place the present invention into proper context. For a more detailed description of the rock bit 10, reference is made to U.S. Pat. No. 4,358,384, the specification of which is expressly incorporated by reference. For description of the environment wherein the rock bit 10 is used, reference is made to the introductory section of the present application for patent.

Thus, the rock bit 10 is a metal body mounted through its threaded pin 14 to a string of drill pipes (not shown), or to a downhole drilling motor (not shown). The rock bit 10 includes three legs 16, one of which is shown on the cross-sectional view of FIG. 2. Each leg 16 has a journal shaft 18 disposed in an angular relationship relative to the general longitudinal axis of the rock bit 10.

A hollow or bored-out cutter cone or cutter 20 is mounted upon the journal shaft 18 to rotate for example on a friction type journal bearing 21. A plurality of balls 22 serve to retain the cutter cone 20 on the journal 18 within a ball race 23 formed between the cutter cone 20 and the journal 18. During assembly of the rock bit 10, the balls 22 are placed into position through a ball channel 24. Thereafter, the balls 22 and the cutter cone 20 are secured on the journal 18 against dislodgment, by a ball plug retainer 26 which is welded into the ball channel 24. The cutter cones 20 have a plurality of hard tungsten carbide inserts 27 which provide the drilling action in the rock (not shown) or other subterranean formation.

The balls 22, the cutter cone 20 and the journal 18 are lubricated by a suitable lubricant 28. A supply of the lubricant 28 is held in a lubricant reservoir 30 incorporated in the rock bit 10. The reservoir 30 is connected to the ball passage channel 24 through a lubricant passage duct 32.

The lubricant reservoir 30 is filled with the suitable lubricating grease 28 before the rock bit 10 is used for drilling. A lubricating grease composition ideally suited for use in rock bits is disclosed in the above-noted U.S. Pat. No. 4,358,384. A pressure compensation subassembly 33 is operatively associated with the lubricant or grease reservoir 30 for the purpose of compensating for fluctuations in internal pressure of the grease 28, and for releasing excess pressure in the same. The pressure compensation subassembly 33 is also described in U.S. Pat. No. 4,358,384, and reference is repeatedly made to the detailed description of said patent.

For the purpose of describing the present invention, it is sufficient to note that the lubricant or grease 28 used in the rock bit 10 has a hydrocarbon base. Typically it comprises approximately 70 percent (by weight), or more, of hydrocarbons. Approximately 50 cubic centimeters of the lubricant or grease 28 are placed into the reservoir 30 of each leg 16 of the rock bit 10 before the rock bit 10 is used for drilling. During operation of the rock bit 10, the lubricant or grease 28 permeates the internal passages and bearing surfaces of the rock bit 10. Without adequate lubrication, the rock bit 10 would fail rapidly.

The bearing surfaces of the rock bit 10, or more precisely stated, the interior bearing surfaces of the cutter cone 20 and of the journal shaft 18, are protected from the external environment by a resilient O-ring seal 34. The O-ring 34 seal is placed into an annular channel or seal gland 36 which is formed between the journal 18 and the cutter cone 20. Since the cutter cone 20 rotates relative to the journal 18, the O-ring seal 34 is expected to seal these surfaces while the O-ring 34 itself remains stationary relative to one (usually the cutter 20) and slips relative to the other.

Figure 3:
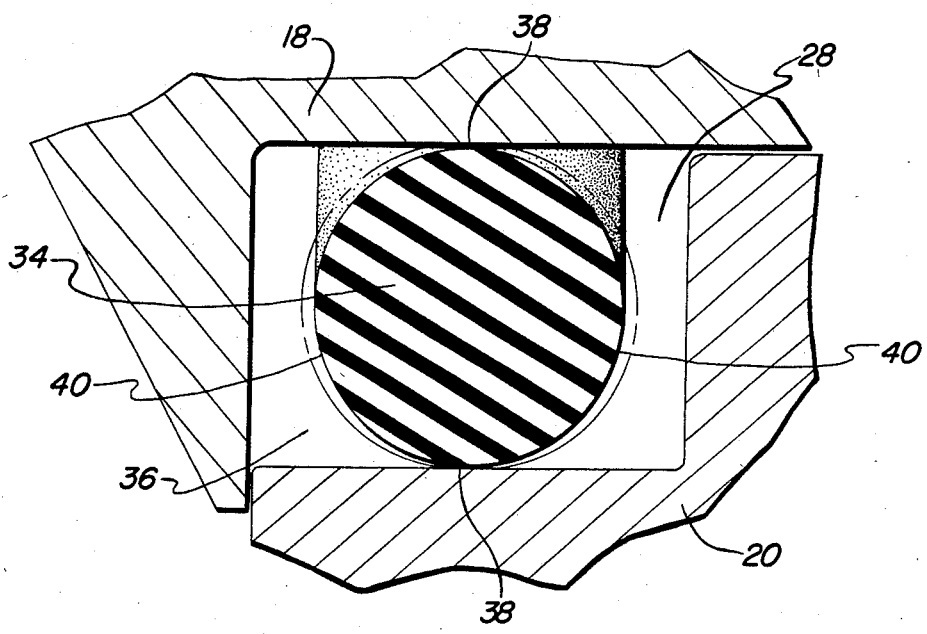
FIG. 3 is an enlarged cross-sectional view showing the O-ring seal of the present invention mounted in position in a rock bit journal and cutter cone assembly, the view showing with dotted lines the O-ring seal after the O-ring seal had been effectively exposed to a lubricating grease.
Figure 4:
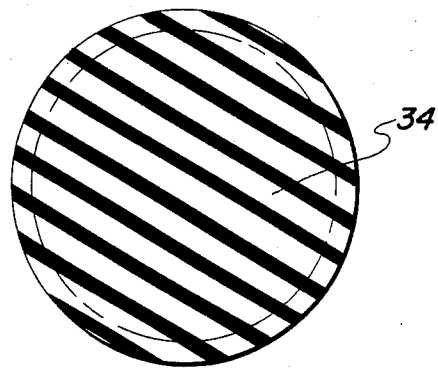
FIG. 4 is a schematic cross-sectional view of an O-ring seal of the present invention, after the seal had been exposed to lubricating grease, the view showing original dimensions of the seal with dotted lines.

As it is apparent from an inspection of FIG. 3, one side of the O-ring 34 is exposed to the external environment such as drilling mud (not shown) and cuttings (not shown) as noted in the introductory section of the present application for patent, while the other side is exposed to the internally supplied lubricant 28. Furthermore, two substantially opposite sides 38 of the O-ring seal 34 are in contact respectively with the stationary and the rotating surfaces of the journal 18 and the cutter cone 20. It is customary to refer to the sides 38 of the O-ring seal 34 which contact the journal 18 and the cutter cone 20 as radially disposed sides, while the other two sides 40 are said to be disposed axially.

In accordance with the present invention, the O-ring seal 34 is made of a resilient material which is capable of undergoing appreciable swelling when exposed to the lubricant or lubricating grease 28. The resilient material of the O-ring seal 34, must, of course, otherwise be suitable to act as the seal 34.

It is noted in this regard that the seal 34 must be able to function at a relatively high temperature (between approximately 200° to 400° F.) and must be able to withstand considerable differential pressures. The prior art has principally utilized nitrile rubber of relatively high acrylonitrile content, (butadiene acrylonitrile, Buna N rubber) for O-ring seal material for downhole rock bit seal applications. Nitrile rubber of relatively high acrylonitrile content, and as far as the present inventors are aware, all other resilient materials used for rock bit seals, have been specifically selected in the prior art for their ability not to swell substantially when exposed to the lubricating grease of the rock bit.

It was found, however, in accordance with the present invention that seals 34 made of ethylene/propylene/diene/methylene (EPDM) rubber or of butadiene acrylonitrile rubber having relatively low acrylonitrile content, undergo appreciable swelling when exposed to a hydrocarbon containing lubricant.

As is well understood by those skilled in the art of rubber chemistry, the term "EPDM rubber" refers to a class of synthetic rubber products which have a basic polymer backbone built of copolymerized ethylene and propylene molecules, and side chains containing a double bond which was available, or has been used, for cross-linking in a vulcanization or final curing step. The side chain is derived from a non-conjugated diene, such as 1,4-hexadiene, which is copolymerized in proper amounts with the ethylene and propylene.

As is further understood by those knowledgeable in rubber chemistry, the term "ethylene/propylene (EP) rubber" is also used sometimes to designate EPDM rubber, and is sometimes used to broadly designate all synthetic rubbers made of ethylene and propylene monomers, regardless of the presence or absence of non-conjugated diene derived side-chains.

Butadiene acrylonitrile (Buna) rubber on the other hand, is based on a copolymer of butadiene with varying amounts of acrylonitrile. Buna rubbers of relatively high acrylonitrile content are specifically recommended in the art for applications where swelling by hydrocarbons is believed to be undesirable and is sought to be avoided.

The meaning of the foregoing terms is well known in the art and is described for example in the handbook titled "Rubber Technology", R. E. Krieger Publishing Co., Malabar Florida, 2nd Edition, 1981, which is expressly incorporated herein by reference.

Thus, referring now principally to the graph of FIG. 5, actual test results are disclosed, quantitatively showing the swelling of EPDM rubber O-ring seals, when the seals are exposed to a hydrocarbon based lubricating grease of the type described in U.S. Pat. No. 4,358,384. More specifically, the graph shows the percentage of radial swelling of the O-ring seals as a function of time, when said seals were exposed to the lubricant respectively at room temperature, and at 212° F. in constrained, and also in unconstrained condition.

The O-ring seals used in this and other tests were configured and dimensioned for functioning as actual seals for rock bit journal bearings. The seals were manufactured by Parker Seal Company of Culver City, Calif., or by Precision Rubber Products, Lebanon, Tenn., and are characterized by the technical specification shown in Table I. In the Table the ingredients are identified by tradename also in addition to generic names, because it is customary in the art to refer to these ingredients by tradename.) The O-ring seals made of this material with inherent high temperature capabiities are presently known to be best suited for the practice of the present invention.

TABLE I

| Component | Amount, phr |
|---|---|
| (ethylene-propylene-diene-methylene polymer, or ethylene-propylene-diene-terpolymer, EPDM) (Nordel 1660; DuPont) | 100 phr |
| Chlorosulfonated polyethylene (Hypalon 20; DuPont) | 5 |
| Carbon black (Statex 160; N110, SAF; Cities Service) | 75 |
| 2,2'-methylene bis (4-methyl-6-tertiary butyl phenol) (Cyanox 2246; American Cyanamid) | 0.5 |
| Dicumyl peroxide (Di-Cup R; Harwick Chemical Corp.) | 3.5 |
| Antimony oxide; (Thermoguard S; M & T Chemicals, Inc.) | 5 |
| Polybutadiene (#6081; Polysciences, Inc.) | 20 |
| Press Cure: 350° F./60 minutes | |
| Post Cure: N$_2$ atmosphere | |
|     350° F. preheat | |
|     50° F./hr. Step-up to 550° F. | |
|     Started at insertion. | |
|     550° F. for 5 hours | |

Thus, the graph of FIG. 5 shows that under temperature conditions approximating downhole conditions (212° F.), the O-rings swell substantially. Furthermore, during approximately the first 48 hours of exposure to the lubricant the swelling is relatively rapid. The graph marked "212° F. unconstrained" on the drawing Figure, bearing the reference numeral 42, reflects substantially uniform swelling of the O-rings around their circular cross-section. The graph bearing reference numeral 44 reflects swelling of the O-rings, in tests where the O-rings were compressed or "squeezed" 15 percent during their exposure to the lubricant. For this graph, measurements of the swelling were taken radially, that is in the direction of the O-ring which had been compressed during the test. As it will be appreciated by those skilled in the art, these measurements reasonably approximate the conditions of an O-ring seal which is mounted in a squeezed condition to seal a rock bit bearing.

As is further apparent from the graphs of FIG. 5, relative swelling of the O-ring decreases with increasing compression of the O-ring. Furthermore, the swelling reaches a "quasi-equilibrium" state in approximately 1-2 days, whereafter the swelling increases less rapidly in time. Still further, even in a relatively highly compressed state (15%) where swelling is less than in an unconstrained state, once quasi-equilibrium is approached the swelling has increased the radial compression or squeeze of the O-ring seal well above 2 percent.

Another resilient seal material which was discovered to swell substantially when exposed to a hydrocarbon based lubricant and to be suitable for use in accordance with the present invention, is butadiene-acrylonitrile rubber of relatively low acrylonitrile content. More precisely stated, butadiene-acrylonitrile rubber formulations which in the process of initial copolymerization contain less than approximately 33% acrylonitrile are capable of swelling when exposed to the hydrocarbon based lubricant 28. As is well understood in the art pertaining to rubber technology, the above-noted percentage refers to the percentage of acrylonitrile in the copolymer before other copolymers (styrene-butadiene in this instance) and other additives are added in the final curing steps.

A preferred formulation of such Buna rubber suitable for use in accordance with the present invention is disclosed in Table 2.

TABLE 2

| Component | Amount, phr |
|---|---|
| Butadiene-Acrylonitrile copolymer (NBR) containing approximately 21% acrylonitrile; (Hycar 1094-80) | 79 |
| Styrene-butadiene copolymer; (SBR 1502) | 21 |
| Zinc oxide | 5 |
| Carbon black | 105 |
| Plasticizer and softener; (Paraplex G-25) | 20 |
| Benzothiazyl Disulfide; (Altex) | 2 |
| Tetramethylthiuram disulfide and tetraethylthiuram disulfide; (M-tuads and E-tuads) | 3 |
| Sulfur | 0.5 |
| Polymerized 1,2-dihydro-2,2,4-trimethylquinoline; (ARRD) | 2 |
| N—isopropyl-N'—phenyl-p-phenylene diamine; (Flexzone 3C) | 2 |
| Press cure: 350° F./10 minutes and 325° F./45 minutes | |

Rubber seals made of the butadiene-acrylonitrile rubber formulation set forth in Table 2 showed approximately 12.5% increase in volume (approximately 4% radial swell) after having been exposed to the hydrocarbon based lubricating grease 28 for approximately 70 hours at approximately 212° F. In this regard it is noted that the ability of the butadiene-acrylonitrile rubbers seals to swell increases with decreasing acrylonitrile content in the copolymer.

In accordance with the foregoing, the O-ring seal 34 of the invention (made of the above-identified EPDM rubber, Buna rubber of low acrylonitrile content, or like material capable of similar swelling) is mounted into the annular channel 36 of the rock bit 10 in a state of relatively small compression or squeeze, or alternatively without any significant compression. The initial compression or squeeze of the seal 34 is preferably less than nine percent.

Since swelling at room temperature is relatively slow and less marked than under the operating conditions of the rock bit 10, the seal 34 is likely to reach operating conditions without more than a few percentage points of swelling. Therefore the seal 34 is still likely to be in a relatively low state of compression or squeeze when drilling with the rock bit 10 is initiated. An important advantage of the initial low state of compression is that undesirable permanent deformation or "compression set" of the seal 34 is mostly avoided. As it was discussed above, a significant disadvantage of highly compressed seals is that the seal loses effectiveness due to compression set. Thus, the present invention provides an O-ring type seal which substantially reaches its operative compression only during operation, and thereby greatly reduces undesirable compression set.

As a further improvement and important additional feature of the present invention, the O-ring seal 34 is altogether prevented from swelling until the seal 34 is placed into an operating environment. This is accomplished by providing a protective barrier 46 on the seal 34 to prevent its effective exposure to the lubricating grease 28 during and after assembly of the seal 34 into the rock bit 10. The protective barrier or layer 46 is, however, of such a nature that it is rapidly, or at least gradually destroyed or dissipated when the rock bit 10 is operated, namely when the cutter cone 20 is rotated several times on the bearing journal 18.

Figure 7:
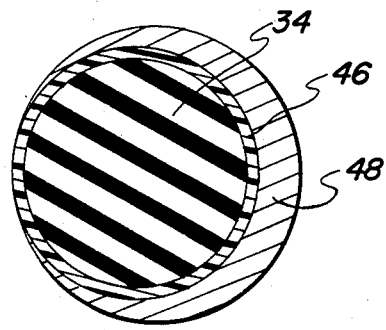
FIG. 7 is a schematic cross-sectional view showing an O-ring which, in accordance with the present invention, is coated with a layer of a substance to prevent premature swelling of the O-ring.

An embodiment of such a protective barrier or layer 46 is schematically shown on FIG. 7. It is a thin, frangible layer of a substance that prevents penetration of the lubricating grease 28 into the resilient material of the seal 34. A thin layer of poly tetrafluoroethylene (TEFLON) is well suited for this purpose. Such a thin poly tetrafluoroethylene layer is readily deposited on the O-ring seal 34, for example, by known plasma (glow discharge) deposition techniques.

A still more preferred embodiment of the protective barrier 46 of the present invention comprises a thin liquid film or layer of a substantially non-volatile liquid, which does not readily dissolve in or mix with the hydrocarbon based lubricating grease 28. Certain fluorinated polymers, and particularly poly-1H, 1H-pentadecafluorooctyl methacrylate is very well suited for this purpose. The latter is available from the 3M Company under the tradename FLUORAD (FC-721), 3M I.D. No. 98-0211-0269-8.

Thus, in accordance with this feature of the present invention, the O-ring seal 34 is dipped into the protective liquid, such as the above-noted FLUORAD, and is thereafter assembled into the rock bit 10. In order to still further protect the seal 34 from effective exposure to the hydrocarbon based lubricant 28, a coating 48 of a fluorosilicone based lubricating grease is also applied to the seal 34 at least on the side where it will be exposed to the lubricating grease 28. The fluorosilicone based lubricating grease 48 does not cause swelling of the seal 34. Nevertheless it has no adverse effect on the overall lubrication of the bearing when the rock bit 10 is operated.

A fluorosilicone based lubricating grease which is very well suited for use in the present invention is available under the name DOW FS-3451. In the practice of the present invention, approximately 10 percent (by weight) of molybdenum disulfide and approximately 5 percent (by weight) of copper flakes are admixed with the fluorosilicone grease before it is applied as the coating 48. Approximately five cubic centimeters of the fluorosilicone grease are applied for the coating 48.

It has been found in experience that the combined FLUORAD liquid film 46 and the fluorosilicone coating 48 effectively prevent swelling of the O-ring seal 34 until such time till operation of the rock bit is commenced. When the cutter cone 20 is, however, repeatedly rotated, as during drilling, the fluorosilicone grease becomes mixed with the hydrocarbon based lubricant 28, and the protective barrier 46 on the seal 34 is removed or destroyed. Consequently, the process of swelling of the seal 34 commences when use of the rock bit 10 is commenced.

The time scale of the swelling process, as illustrated in FIG. 5 and observed in experience, compares advantageously with the rate of wear of the seal 34, and with the approximately 100-120 hour expected operating life of the rock bit.

Thus, during approximately the first 24-48 hours of operation of the rock bit 10, the seal 34 undergoes relatively rapid swelling, and attains increasing compression or squeeze. Thereafter the swelling still continues slowly for up to approximately 6 days of exposure to the hydrocarbon solvent. The swelling compensates, on the one hand, for the gradual wear of the radial sides of the seal 34. On the other hand, gradually increasing compression or squeeze which occurs only during the actual operation of the rock bit 10, minimizes undesirable and premature compression set of the seal 34.

An O-ring seal constructed and tested in accordance with the present invention was extensively tested substantially simulating the conditions of a "downhole" operation in a rock bit. The axial diameter of the seal was found to be increased 10.5 percent due to swelling. The radial diameter showed a mere 2 percent decrease, indicating that swelling compensates for very substantial wear.

O-ring seal assemblies constructed and operated in accordance with the principles of the present invention have been found to perform well. More particularly, on one specific occasion, a rock bit incorporating the seal assembly of the present invention, installed with 9.1 percent initial squeeze and also incorporating a prior art nitrile rubber seal for control, was retrieved from a drilling operation for reasons unrelated to the rock bit. The seals were examined. The seals of the present invention were found to be in good condition whereas the prior art nitrile rubber seal was worn to the extent that it allowed leakage.

The findings and results obtained in accordance with the present invention are unexpected and surprising because the prior art has generally considered swelling of seals undesirable. Furthermore, EPDM rubber seals were specifically not recommended in the prior art for use with hydrocarbons, although a recent study titled "Use of Ethylene Propylene Rubber for Sealing Petroleum Fluids in Diesel Engines", SAE Technical Paper Series, International Congress & Exposition Detroit, Mich., Feb. 22-26, 1982, discusses the use of EP rubber seals in static applications in conjunction with hydrocarbon fluids. Therefore, the fact the seals which undergo swelling perform well even under the demanding dynamic conditions of a rock bit is unexpected and surprising.

Figure 6:
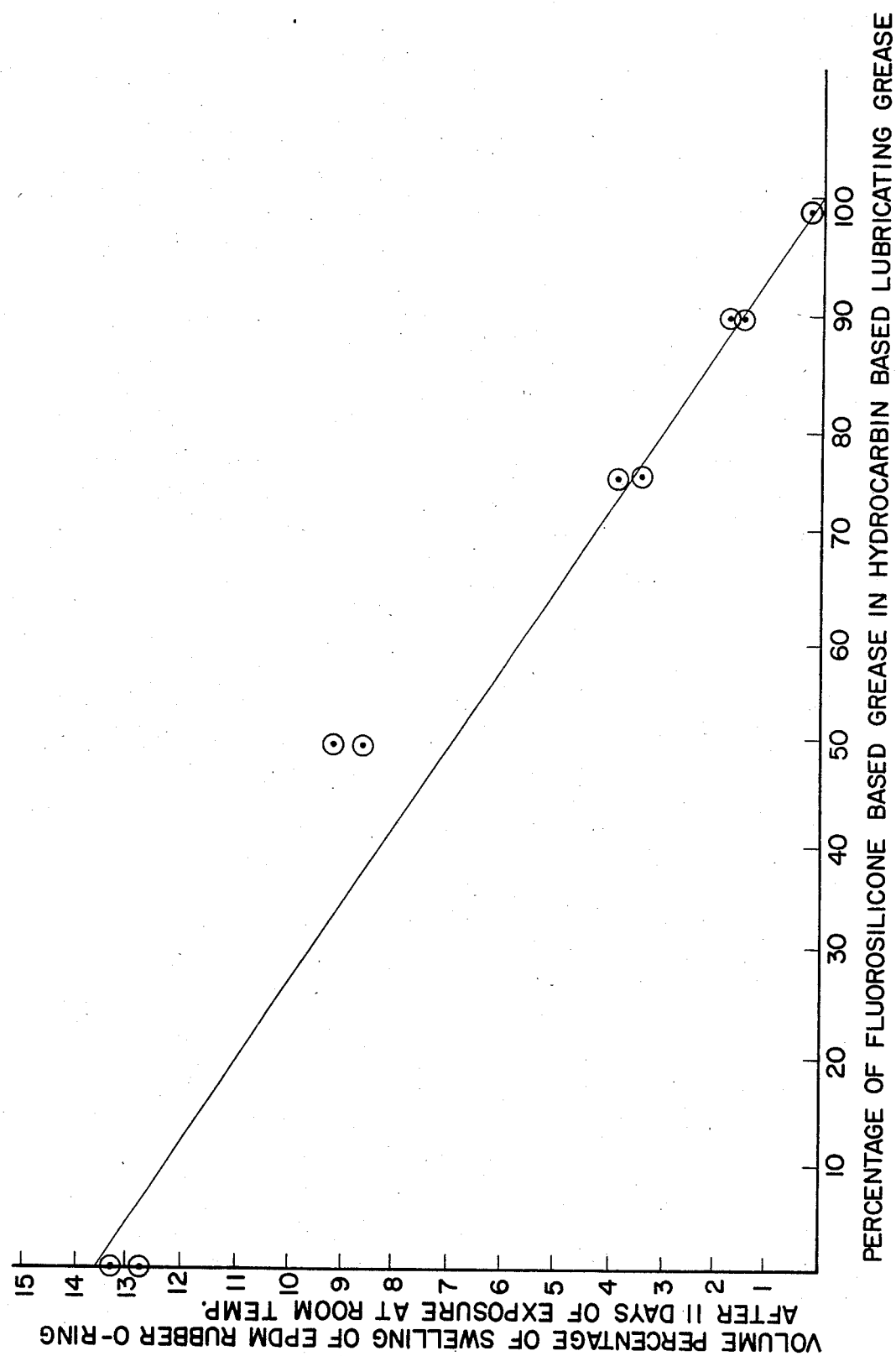
FIG. 6 is a graph showing the swelling of EPDM rubber O-ring seals as a function of grease composition, after prolonged exposure of the O-ring seals to the grease composition.

Referring to FIG. 6, still another important feature of the present invention is disclosed, in that swelling and therefore compression or squeeze of the O-ring seal 34 is controllable through the composition of the lubricating grease 28 to which the seal 34 is exposed. The graph of FIG. 6 shows actual test results obtained in accordance with the foregoing principle. More specifically, the graph shows percentage of swelling of EPDM rubber O-ring seals, configured for rock bit use, as a function of the composition of the grease 28, when the seals 34 were exposed to the grease 28 for eleven days at room temperature. The hydrocarbon grease used for this test was of the type disclosed in U.S. Pat. No. 4,358,384, and the fluorosilicone grease was DOW FS-3451 grease containing ten percent (by weight) of molybdenum disulfide, and five percent (by weight) of copper flakes. It is apparent from the graph that a decreasing, substantially linear relationship exists between the attained swelling and the fluorosilicone grease content of the overall lubricant.

Several modifications of the present invention may become apparent to those skilled in the art in light of the above-disclosed generic principles. In this regard, it is particularly noted that a wide variety of O-ring materials and matching lubricants, or swelling agents contained in the lubricants, may become apparent for the practice of the present invention. Furthermore, although the invention was described with principal reference to rock bit technology, the novel seal assembly of the invention is useful in many applications, particularly where effective sealing under dynamic and harsh conditions is required. In light of the foregoing, the scope of the invention should be interpreted solely from the appended claims.

What is claimed is:

1. A rock bit having at least one bearing journal and a cutter rotatably mounted on the bearing journal, bearing surfaces between the journal and the cutter being substantially continuously lubricated by an internal supply of a hydrocarbon containing lubricant during operation of the rock bit, the rock bit further comprising:

a resilient O-ring seal disposed within an annular chamber formed between the journal and the cutter, the O-ring comprising a material which swells substantially when effectively exposed to the lubricant, said O-ring together with the lubricant comprising means for increasing the volume of the O-ring relative to the state when the O-ring is initially mounted into the rock bit, whereby at least in its swollen state the O-ring is substantially compressed between the journal and the cutter, and means in operative association with the O-ring for preventing effective exposure of the O-ring to the hydrocarbon containing lubricant until the cutter is repeatedly rotated on the journal, the means comprising a coating on the O-ring of a material that substantially prevents penetration of the hydrocarbon based lubricant into the O-ring, and adapted to be substantially worn away from the O-ring during ordinary use of the O-ring in the rock bit, thereby permitting effective exposure of the O-ring to the hydrocarbon based lubricant during such ordinary use.

2. The rock bit of claim 1 wherein the coating comprises a thin film of a material selected from a group consisting of poly tetrafluoroethylene and poly-1H, 1H-pentadecafluorooctyl methacrylate.

3. The rock bit of claim 2 wherein the coating is a film of poly-1H, 1H-pentadecafluorooctyl methacrylate and the means further comprise a layer of fluorosilicone based lubricating grease.

4. The rock bit of claim 2 wherein the coating is a film of polytetrafluoroethylene and further comprises a layer of fluorosilicone based lubricating grease.

5. The rock bit of claim 1 wherein the O-ring comprises ethylene/propylene/diene/methylene rubber.

6. The rock bit of claim 1 wherein the O-ring comprises butadiene-acrylonitrile rubber wherein the acrylonitrile content of the copolymer prior to curing is less than approximately 33 percent.

* * * * *